UNITED STATES PATENT OFFICE.

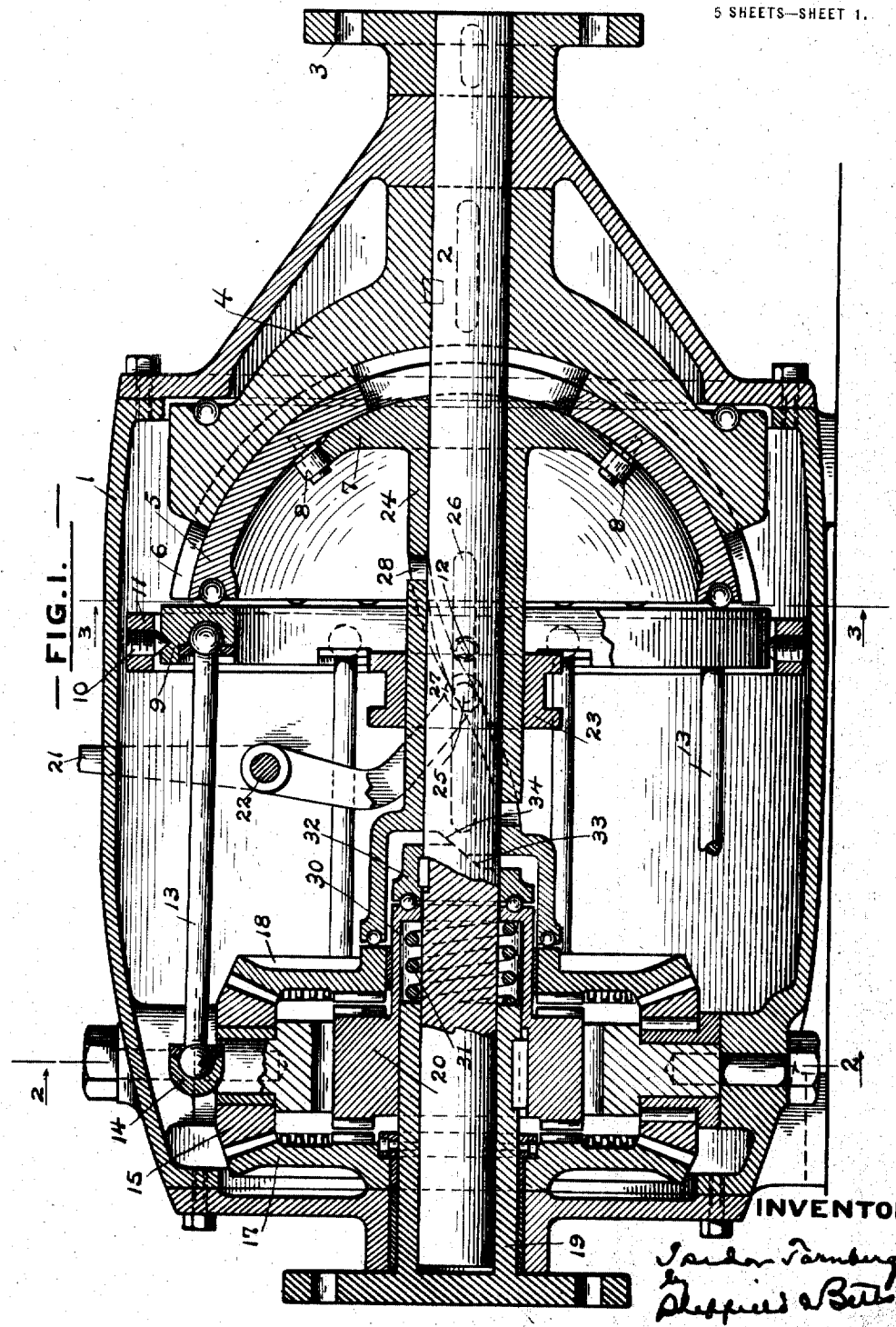

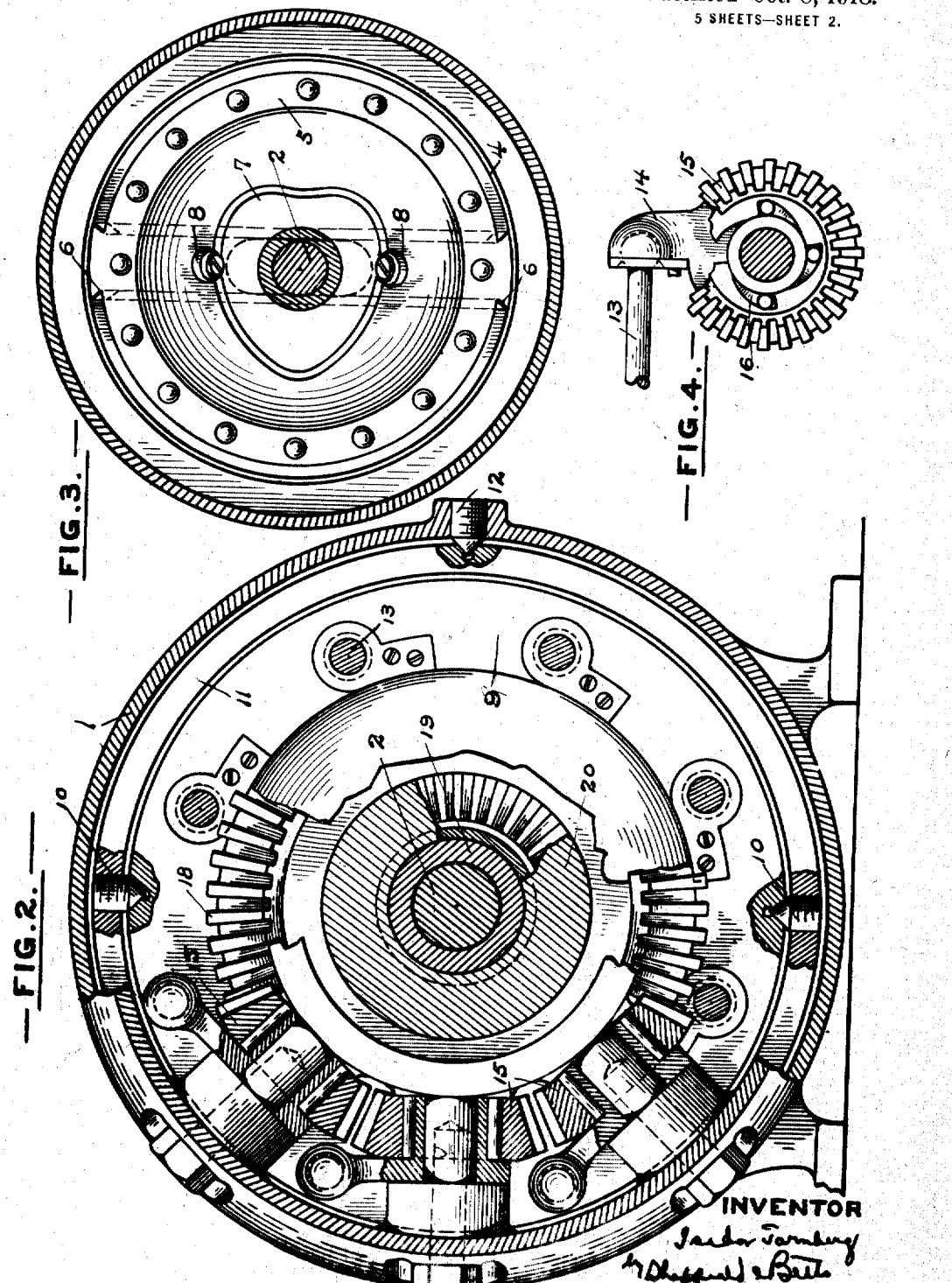

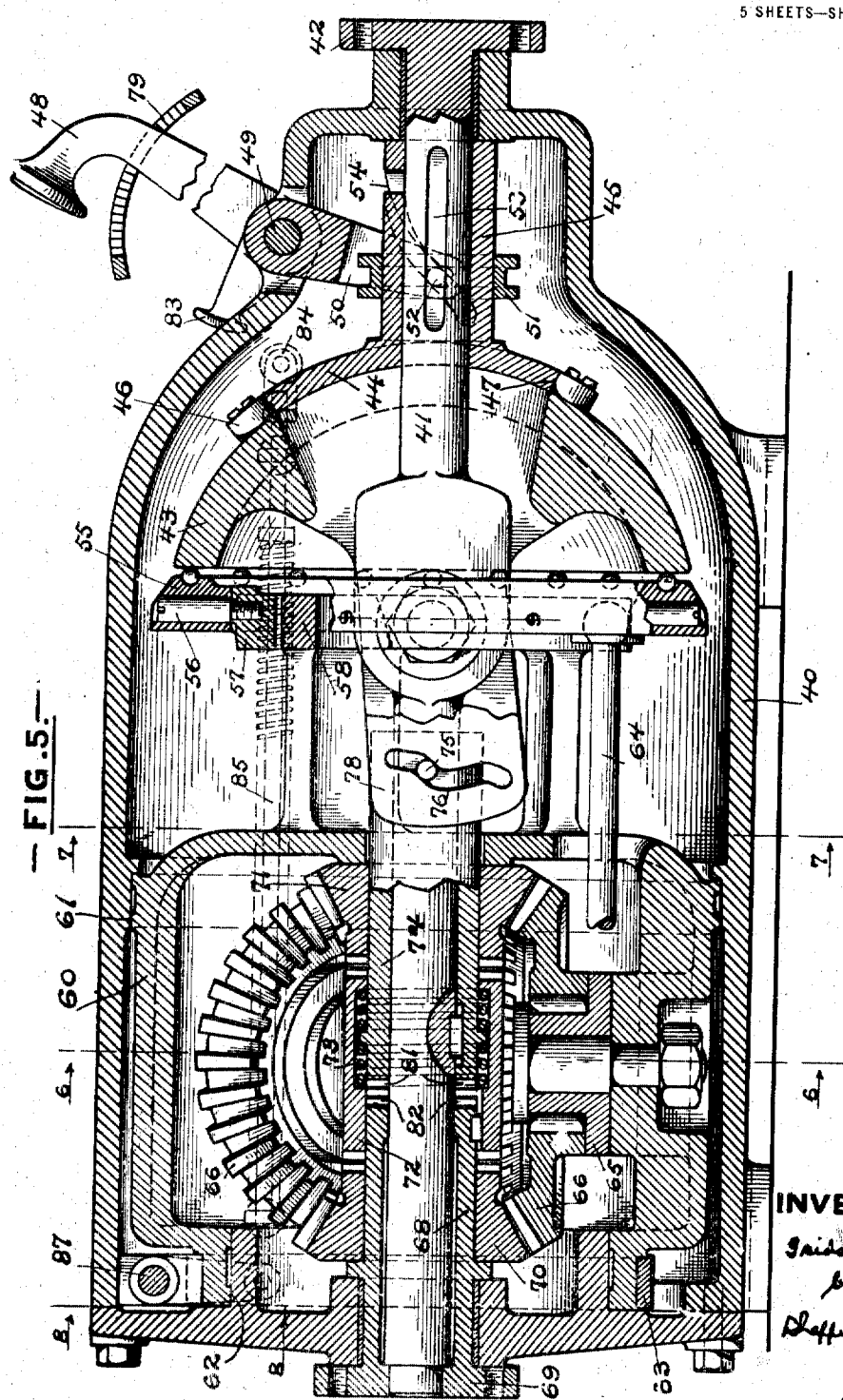

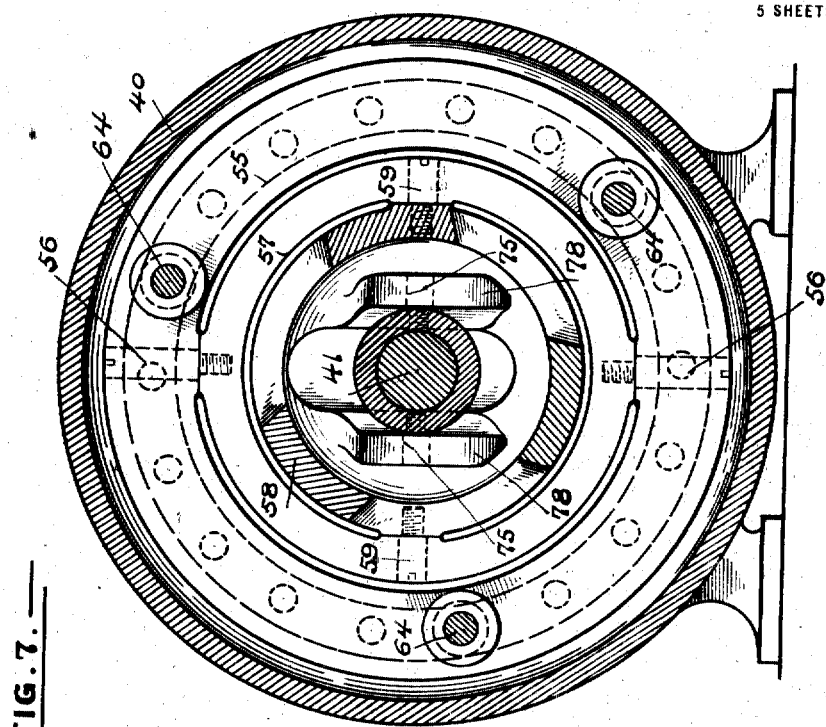
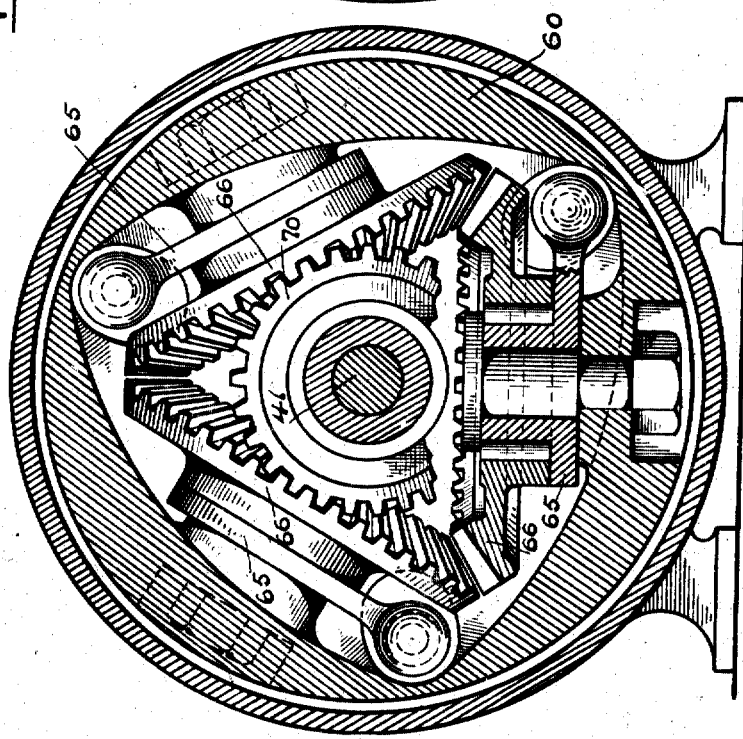

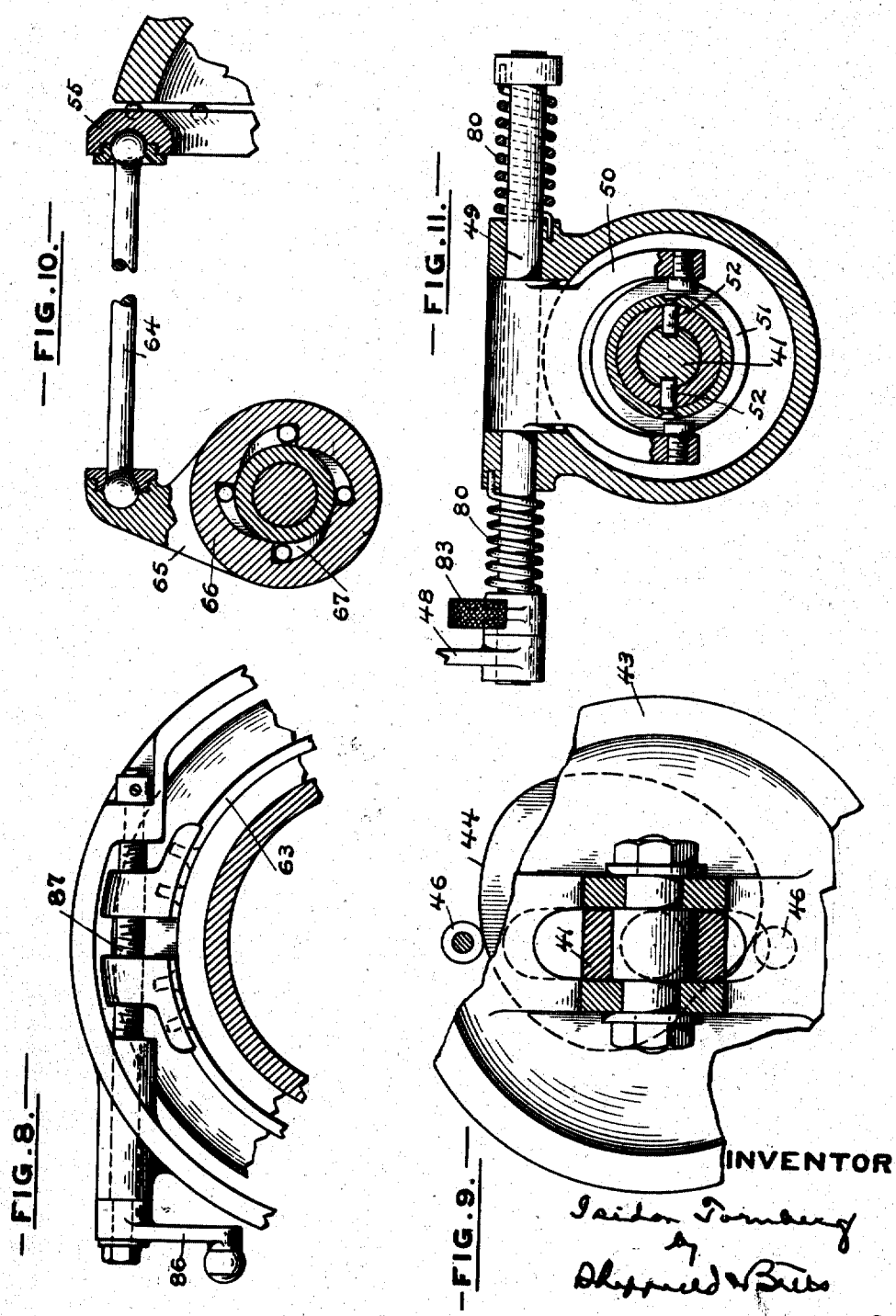

ISIDOR TORNBERG, OF NEW YORK, N. Y.

VARIABLE-SPEED POWER-TRANSMITTER.

1,280,901.   Specification of Letters Patent.   Patented Oct. 8, 1918.

Application filed August 4, 1916. Serial No. 113,057.

*To all whom it may concern:*

Be it known that I, ISIDOR TORNBERG, a citizen of the United States, and a resident of the city of New York, county of Kings, State of New York, have invented certain new and useful Improvements in Variable-Speed Power-Transmitters, of which the following is a full, clear, and complete disclosure.

My invention relates to a mechanical variable speed device adapted for use in connecting the driving members to the driven members in machines of various kinds where it is desired to vary the speed of the driven member with respect to the driving member or to reverse its direction of rotation and is particularly adapted for use in automobiles and other machines where gradual changes of speed are desired.

The object of my invention is to provide a relatively strong and simple variable gear or speed changing device which will give a gradual change of speed which may be reversed, which will permit a direct drive when desired, and which will allow the driven member to remain at a standstill while the driving member continues to revolve at its regular speed without the use of friction or other clutches which are commonly used for this purpose.

With these objects in view, my improved device comprises a series of connecting rods connected with and adapted to be reciprocated or oscillated by the driving member, a series of rotary gears connected to the driven member and also connected to the connecting rods by one way clutches so as to be progressively rotated or driven thereby to impart a continuous rotary motion to the driven member. It also comprises means whereby the throw or stroke of the connecting rods may be varied to thereby vary the speed of the driven member. It also comprises means whereby the rotation of the driven member may be reversed and preferably comprises means for connecting the driven member directly to the driving member when the two have been brought to substantially the same speed.

My device also embodies other improved features such as will make it impossible for the careless operator to suddenly change the forward direction of motion of the driven member to the reverse direction without bringing the machine to the neutral or no speed position in the transition, thus avoiding serious damage to the mechanism, and other features which I will describe in connection with the preferred embodiments of my invention shown in the drawing accompanying and forming a part of this specification.

Referring to the drawing:

Figure 1 shows a longitudinal section of one embodiment of my improved device.

Fig. 2 is a transverse section taken on the line 2—2 of Fig. 1.

Fig. 3 is a section reduced in size taken on the line 3—3 of Fig. 1.

Fig. 4 is a detail view showing the one way clutches employed to connect the connecting rods to the driving pinions or gears.

Figs. 5 to 11 inclusive, show a modification of my device particularly adapted for use in automobiles; Fig. 5 being a vertical section of this modification; Fig. 6 is a transverse section taken on the line 6—6 of Fig. 5; Fig. 7 a transverse section taken on the line 7—7 of Fig. 5; Figs. 8, 9, 10 and 11 are detail views.

Referring in detail to the structure shown in Figs. 1 to 4, 1 designates a casing or housing in which the mechanism of the transmission is contained and 2 designates the driving shaft or driving member which may be connected at 3 to any suitable source of power. 4 designates a bowl shaped member keyed to the driving shaft 2 and arranged to receive and support the member 5 which I will refer to hereinafter as the propelling disk. This disk 5 is provided at its back with a projection 6 which rests in a suitable groove cut in the face of the bowl 4 and the arrangement is such that the disk 5 will revolve with the member 4 but it can be adjusted or tilted by rotating cam 7 mounted on the shaft 2. This cam engages rolls or studs 8 mounted on the disk, as shown in Fig. 3, and the arrangement is such that when the cam is rotated in either direction from the neutral position shown in the drawing the disk will be tilted or inclined with respect to shaft 2. A ring 9 is pivotally mounted by studs 10 in an outer ring 11 and this outer ring 11 is also pivotally mounted by studs 12 (see Fig. 2). The studs 12 are disposed 90 degrees from the studs 10 and the arrangement is such that the ring 9 can be rocked or tilted by the disk 5 when this disk is thrown out of its neutral position as shown in Fig. 1. The connecting rods 13 are each secured at one end to the ring 9 and at their other ends to levers 14 which in turn are secured to the bevel driving gears 15 by one-way clutches or ratchets 16. The gears 15 are arranged to mesh with two main driving gears 17 and 18, both mounted on the driven member or shaft 19. A clutch member 20 is slidably mounted on the driven member 19 and is keyed to revolve therewith. The operator's lever is shown at 21 and is pivoted at 22 with its inner end in engagement with the sliding collar 23. The collar 23 is slidably mounted on the sleeve 24 formed integral with the cam 7. The collar 23 has a stud 25 mounted thereon arranged to slide in a longitudinal slot 26 in the shaft 2, and also in the curved slot 28 in the sleeve 24, and the arrangement is such that by moving the lever 21 and thereby shifting the collar 23 endwise along the sleeve 24, the sleeve 24 and cam 7 formed integral therewith are rotated with respect to the shaft 2 and the disk 5 is tilted by the cam so that when rotated it will rock or oscillate the ring 9 and thereby imparting oscillatory motion progressively to the connecting rods 13. The throw of these connecting rods can be adjusted by the lever 21 and this makes it possible to gradually and progressively adjust the speed of rotation of the driving gears 17 or 18. The clutch member 20 which connects either gear 17 or gear 18 to the driven member carries an extension sleeve 30 which is held by a spring 31 against the cap 32. The cap 32 is provided with an inclined surface 33 shown in dotted lines in Fig. 1 and this inclined surface rests against a second inclined surface 34 formed on the sleeve 24. These inclined surfaces are so disposed that by moving the operating lever 21 in one direction and thereby turning the hub 24 in a corresponding direction the clutch member 20 will be forced into engagement with one of the driving gears, say 17, while by moving the operating lever in the opposite direction the spring 30 will be permitted to force the clutch member 20 into engagement with the other gear, namely, 18. It must be noted that the end motion of the sleeve 30 takes place at the initial motion of the operator's handle 21, i. e., when the driven member is being rotated at the slowest possible speed. As the handle 21 is further manipulated to get a higher speed of the driven member no further end motion of the sleeve 30 and clutch member 20 takes place. Hence there is no danger of shock or breakage of the clutch teeth when they are engaged.

The mechanism described above is shown in neutral position, that is, the operating surface of the disk 5 is perpendicular to the driving shaft 2 so that the rotation of the driving shaft will not move the ring 9. The operation of the device briefly described is as follows: By gradually moving the top of the operating lever forward or toward the source of power the clutch 20 is forced into engagement with the gear 17 and simultaneously the disk 5 is gradually tilted so as to incline the ring 9, which, being rotated in inclined position oscillates the connecting rods progressively and with a stroke depending on the inclination of the disk. The connecting rods impart rotary motion progressively to the gears 15 and these gears in turn come into operation progressively and impart a rotary motion to the driving gear 17. The speed of this gear and the driven member 19 may be varied by adjusting the disk 5 as above explained. When it is desired to reverse the direction of drive the lever 21 is moved in the opposite direction with the result that the ring 5 is first brought to a neutral position at which time the clutch member 20 is disengaged from gear 17 and then at a further movement of the lever 21 in the same direction the member 20 is clutched to disk 18 and ring 5 is again tilted and the driven member 19 is driven in the reverse direction at any desired speed.

The modification shown in Figs. 5 to 11 inclusive, which I will now describe, operates in the same general way and embodies mechanisms in part the same, as the apparatus described above. The numeral 40 designates an outer casing in which the apparatus is assembled. 41 designates the driving shaft which may be connected at 42 to the source of power. 43 is the driving disk and this is mounted in the bowl shaped face of a cam member 44 which in turn carries a sleeve 45 made integral with 44 mounted on the driving shaft 41. Rollers 46 are mounted on the rear surface of the driving disk and engage the cam surface 47 of the cam 44. 48 designates the operator's pedal pivoted at 49 and provided at its inner end with a yoke 50 which engages the collar 51 slidably mounted on sleeve 45. The collar 51 carries a pin 52 shown in Fig. 11, and this pin is arranged to slide in longitudinally disposed slot 53 in the driving shaft and also in the curved slot 54 in the sleeve 45 and the arrangement is such that by moving the pedal and shifting the collar the relative position of the sleeve with respect to the driving shaft may be shifted. This results in a partial rotation of the cam 44 and a tilting of the ring 55. The ring 55 is pivoted by studs 56, located 180 degrees apart, to the inner ring 57 and this inner ring 57 is pivotally secured to the member 58 by pins 59 (see Fig. 7) disposed 90 degrees from the pins 56. The member 58 is formed integrally with an inner housing 60 and is adapted to rotate therewith. This inner housing is journaled at 61 and 62 in the outer casing and is free to rotate therein except when restrained by the brake 63 to which I will later refer.

As in the arrangement already described the present arrangement comprises connecting rods for connecting the oscillatory ring with a series of drive pinions or gears. These are shown at 64 and are connected at one end to the ring 55 and at the other end to oscillatory levers 65 connected with the gears 66 by one-way clutches or ratchets 67. 68 designates the driven shaft to be attached to any suitable element to be driven at 69. 70 and 71 designate the direct and reverse driving gears. A clutch member 72 is provided and is normally held in position shown in the drawing by springs 73. In order to shift this clutch member and throw it in engagement with either the forward or reverse gear I provide a sleeve 74, mounted on the shaft 41 and provided with a pin 75, disposed in a cam shaped slot 76 in the member 78 which is formed integrally with the driving disk 43. The groove 76 is so shaped that when the pedal 48 is released from the notched segment 79 and allowed to move backward under the pull of spring 80 the groove 76 will throw the sleeve 74 to the rear and cause it to engage the driving gear 70. On a further movement of the pedal in the same direction the driving member will progressively be brought up substantially to the speed of the driven member and on a still further movement of the pedal the teeth 81 on the sleeve 74 will engage teeth 82 on the driven member and result in a direct drive. Simultaneously cam 83 will engage the end 84 of the push rod 85 and cause this rod to swing the lever 86 (see Fig. 8) and turn the screw 87 thereby loosening the brake 63, permitting the housing 60 and its contained mechanism to rotate freely. To reverse the direction of the drive the pedal 48 is pushed outwardly. This results in first applying the brake 63 then in gradually bringing the drive to neutral position then in unclutching the driving gear 70 and next in clutching the gear 71 to the driven shaft so that the rotation of the driven member will be reversed and it may be driven in a reversed direction progressively at any desired speed. It will be seen that the number and size of pinions 66 may be so proportioned that the driven member will rotate at approximately the speed of the driving member when the point for direct connecting the two members arrives. Thus the two clutches are brought to rotate at approximately the same speed before they may be engaged.

While I have described only two embodiments of my invention I am aware that further embodiments may be made without departing from the scope of my claims.

What I claim is:

1. In a device of the kind described, a driving shaft, a driven shaft in alinement therewith, a plurality of connecting rods arranged substantially parallel to said shaft connecting with and adapted to be reciprocated by said driving shaft, a gear mounted on said driven shaft, a plurality of gears meshing therewith and connected with said connecting rods by one-way clutches, all for the purpose described.

2. In a device of the kind described, a driving shaft, a plurality of connecting rods connected with and adapted to be reciprocated by said driving shaft, a driven shaft, two driving gears mounted thereon, a series of gears in mesh with said driving gears and connected with said connecting rods by one-way clutches, in connection with means for clutching either one or the other of said driving gears to the driven shaft, all for the purpose described.

3. In a device of the kind described, a driving shaft, a driven shaft in alinement therewith, a plurality of connecting rods arranged substantially parallel to said shaft connected with and arranged to be reciprocated by said driving shaft, means for varying the stroke of said connecting rods, a driving gear mounted on said driven shaft, a plurality of gears meshing therewith and connected with said connecting rods by one-way clutches, all for the purpose described.

4. In a device of the kind described, a driving shaft, a plurality of connecting rods connected with and adapted to be reciprocated by said driving shaft, means for varying the stroke of said connecting rods, a driven shaft, two driving gears mounted thereon, a series of gears in mesh with said driving gears and connected with said connecting rods by one-way clutches in connection with means for clutching either one or the other of said driving gears to the driven shaft, all for the purpose described.

5. In a device of the kind described, a driving shaft, a rotatable disk keyed thereon, a pivoted ring fixed against rotation and so disposed as to be given a rocking motion by the rotation of the said disk when inclined with respect to the driving shaft and means for adjusting the inclination of the disk for the purpose described.

6. In a device of the kind described, a driving shaft, a rotatable disk keyed thereon, a pivoted ring fixed against rotation and disposed against the face of said disk, a plurality of connecting rods connected at one end to said ring, means for tilting said disk so that its rotation will impart a rocking motion to said ring and a reciprocating motion to said connecting rods, a driven shaft, two driving gears mounted thereon, a plurality of gears in mesh with said driving gears and connected with said connecting rods by one-way clutches, all for the purpose described.

7. In a device of the kind described, a driving shaft, a rotatable disk mounted thereon having a semi-spherical shaped back, a cam also mounted on said shaft having a dished or bowl shaped face adapted to receive said disk and means for rotating said cam for the purpose of tilting said disk with respect to the shaft, all for the purpose described.

8. In a device of the kind described, a driving shaft, a plurality of connecting rods connected with and adapted to be reciprocated by said driving shaft, a driven shaft, two driving gears mounted thereon, a series of gears in mesh with said driving gears and connected to said connecting rods by one-way clutches in combination with means for varying the stroke of said connecting rods, for clutching either of said driving gears to the driven shaft and for connecting the driving and driven shafts direct for the purpose described.

9. In a device of the kind described, a driving member, a driven member, a variable speed mechanism comprising a plurality of reciprocating levers adapted to transmit power from one member to the other member, a housing adapted to contain a portion of the mechanism, and held against rotation by a clutch, means for operating said clutch, whereby the variable speed mechanism becomes inoperative, and means for simultaneously clutching the driving and driven members directly to each other.

10. In a device of the kind described, a driving shaft, a driven shaft, in alinement therewith a plurality of connecting rods arranged substantially parallel to the driving shaft and connecting with and adapted to be reciprocated by said shaft, and means actuated by said rods adapted to rotate the driven shaft.

11. In a device of the kind described, a driving shaft, a driven shaft in alinement therewith, a plurality of connecting rods arranged substantially parallel to the driving shaft, means acting upon the rotation of said driving shaft for reciprocating said rods bodily in lines substantially parallel to the driving shaft, and means actuated by said rods for rotating the driven shaft.

12. In a device of the kind described, in combination, a driving member, a driven member, and variable speed mechanism intermediate said members including a ring, a mounting for said ring permitting it to tilt in any direction with respect to the axis of said driving shaft, a housing mounted to rotate and supporting the mounting of said ring, a brake for said housing, and means for tilting the plane of said ring in different directions as said driving member rotates.

13. In a device of the kind described in combination, a driving member, a driven member, and variable speed mechanism intermediate said members including a ring, a gimbal mounting for said ring, a housing mounted to rotate and supporting said gimbal mounting, a brake for said housing, and means for tilting the plane of said ring in different directions as said driving member rotates.

14. In a device of the kind described, a driving shaft, a pivoted ring fixed against rotation, a rotatable disk fixed to said shaft and pressing against said ring, means whereby said disk and ring may be tilted with respect to the axis of said shaft, a driven shaft, two driving gears mounted thereon, means for rotating said gears from said ring, a clutch for connecting either of said gears to the driven shaft as desired, and operating connections between said disk and said clutch whereby the inclination of said disk determines the operation of said clutch.

15. In a device of the kind described, a driving shaft, a driven shaft in alinement therewith, a gimbal mounted ring normally fixed against rotation, a disk mounted on said driving member in contact with said ring and arranged to be tilted with respect to the axis of said driving shaft, a plurality of rods connected to said ring and substantially parallel to said shafts, and gearing between said rods and said driven shaft.

ISIDOR TORNBERG.